(12) United States Patent
Plantan et al.

(10) Patent No.: US 6,318,240 B1
(45) Date of Patent: Nov. 20, 2001

(54) BRAKE ACTUATOR

(75) Inventors: Ronald S. Plantan, Charlotte; Duane J. Demus, Mount Holly, both of NC (US)

(73) Assignee: Indian Head Industries, Inc., Charlotte, NC (US)

( * ) Notice: Subject to any disclaimer, the term of this patent is extended or adjusted under 35 U.S.C. 154(b) by 0 days.

(21) Appl. No.: 09/228,586

(22) Filed: Jan. 11, 1999

Related U.S. Application Data

(60) Provisional application No. 60/072,948, filed on Jan. 29, 1998.

(51) Int. Cl.[7] .................................................. F01B 21/00
(52) U.S. Cl. ..................................... 92/161; 92/62; 92/64; 92/169.1
(58) Field of Search ........................... 92/62, 63, 64, 92/161, 169.1

(56) References Cited

U.S. PATENT DOCUMENTS

| | | | |
|---|---|---|---|
| 3,264,951 | * | 8/1966 | Dobrikin ................... 92/64 |
| 4,031,814 | * | 6/1977 | Lukens et al. ............. 92/63 |
| 5,016,523 | * | 5/1991 | Bowyer ..................... 92/63 |

* cited by examiner

Primary Examiner—Edward K. Look
Assistant Examiner—Thomas E. Lazo
(74) Attorney, Agent, or Firm—Howard & Howard

(57) ABSTRACT

An improved brake actuator, particularly an improved sealed service chamber, having a flexible tubular seal affixed at one end in the central pushrod opening in sealed relation and surrounding the pushrod in sealed relation in the service chamber housing. The improved seal is generally hourglass-shaped including a midportion which closely circumscribes the pushrod in sealed relation and a free end portion which closely circumscribes the pushrod. A relatively inflexible generally diamond-shaped washer surrounds the midportion of the seal which improves sealing, assures concentricity of the tubular seal, prevents the seal from being pushed through the pushrod opening and provides for easy assembly of the seal and washer assembly in the service chamber around the pushrod. The improved end wall of the service chamber housing includes an offset recessed central portion surrounding the mounting bolts and relatively thin preferably V-shaped contact surfaces which generally circumscribe the recessed portion. The contact surfaces are drawn tightly against the mounting bracket as the nuts on the mounting bolts are torqued against the mounting bracket, significantly reducing vibration between the end wall of the service chamber and the mounting bracket.

7 Claims, 4 Drawing Sheets

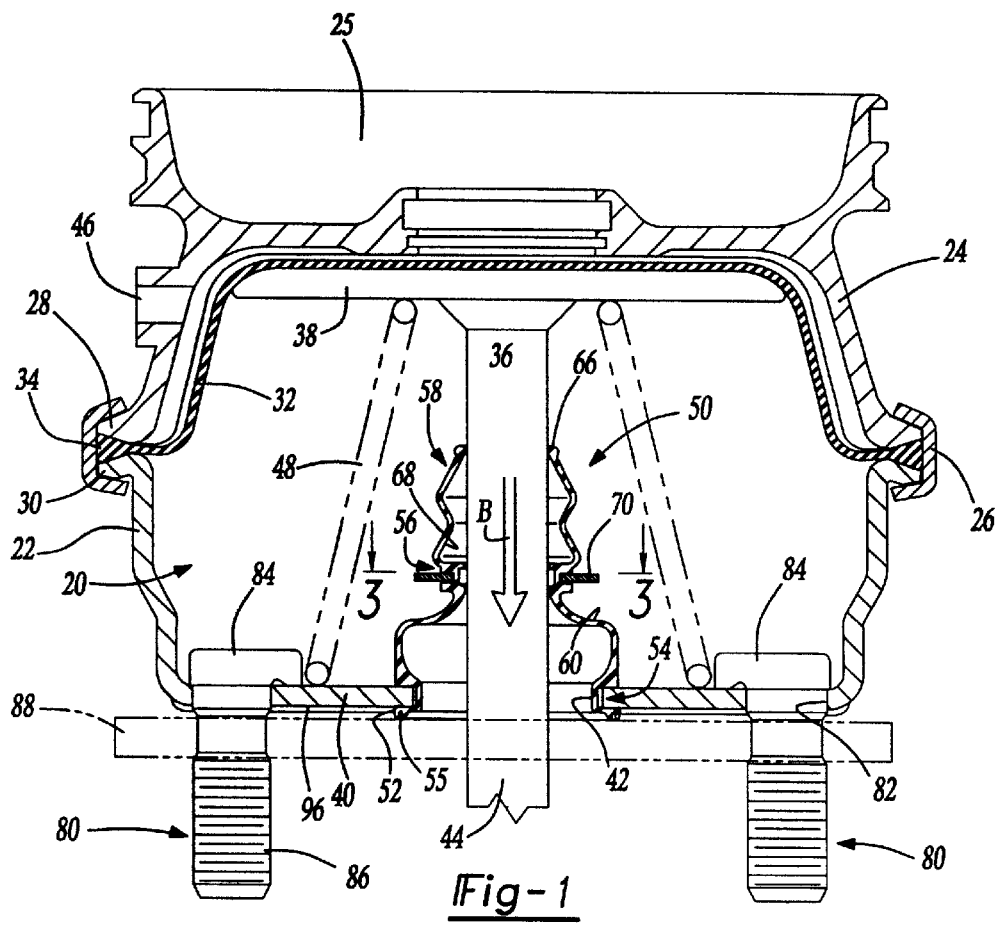
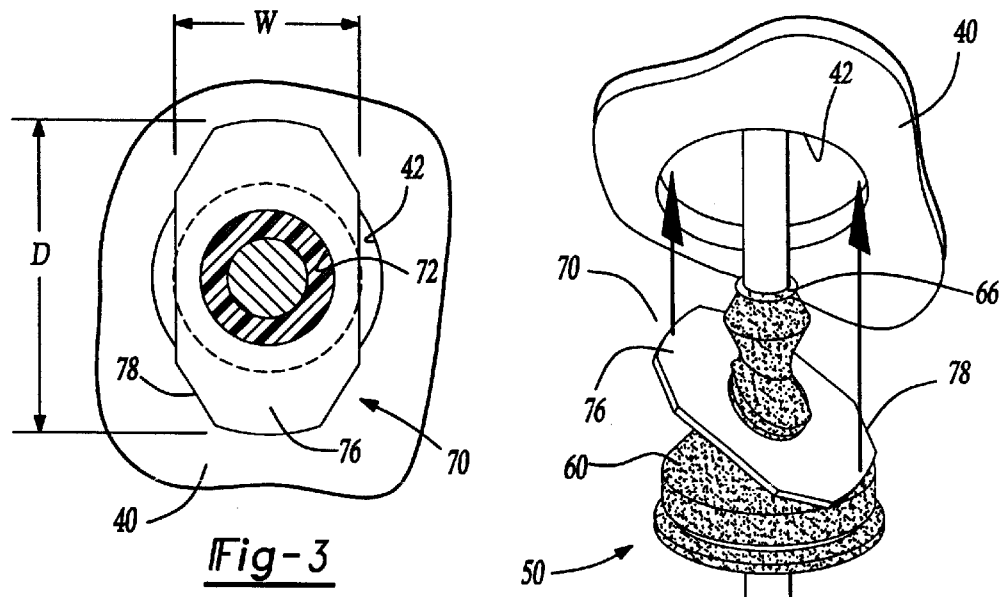

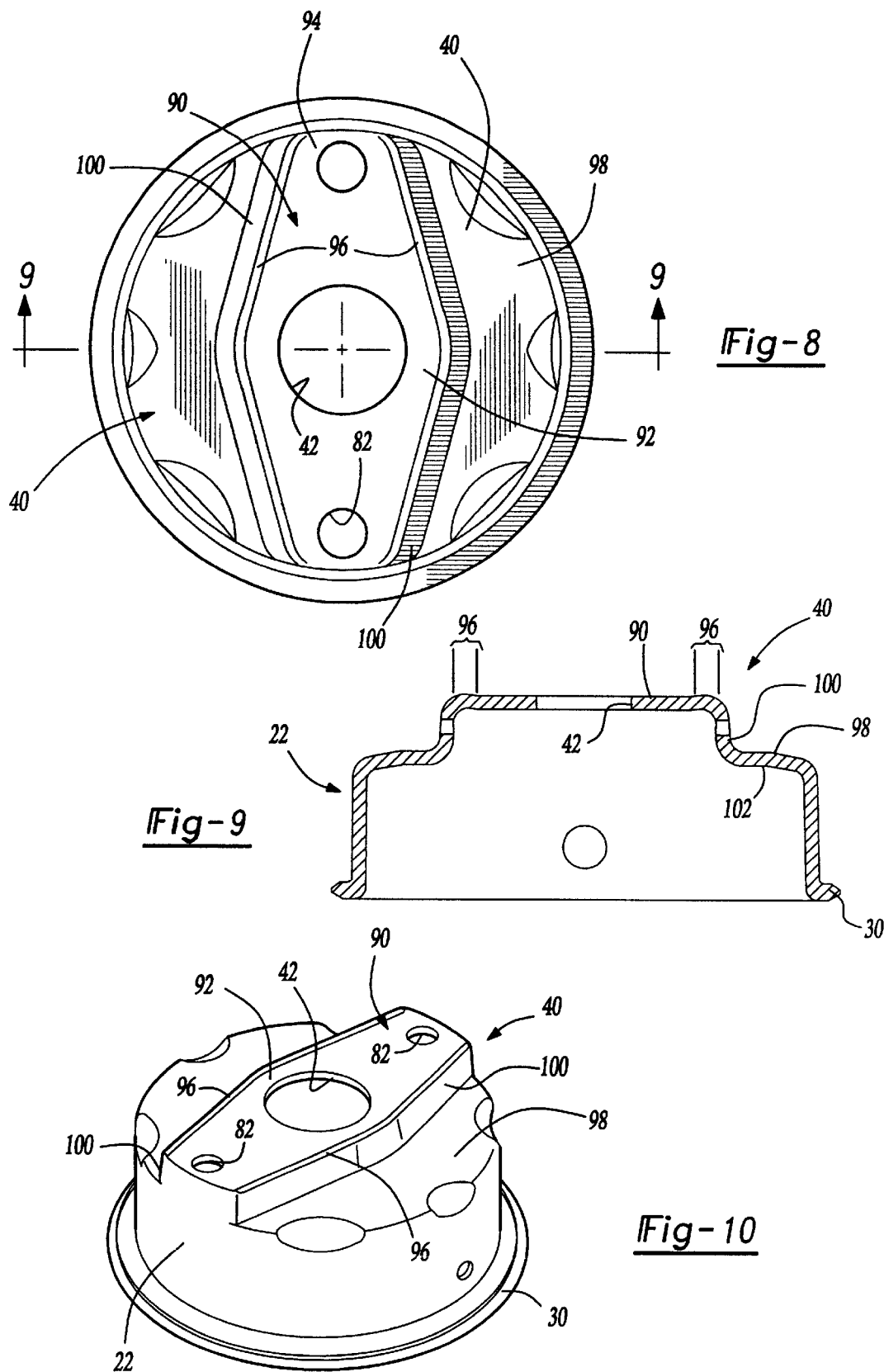

BRAKE ACTUATOR

This application claims benefit to provisional application 60/072,948 filed Jan. 29, 1998.

FIELD OF THE INVENTION

This invention relates to brake actuator service chambers having an improved seal of the pushrod opening in the end wall of the housing and an improved end wall which reduces vibration damage of the service chamber when mounted on a supporting bracket.

BACKGROUND OF TEE INVENTION

Brake actuator service chambers of the type disclosed herein are used on trucks, semitrailers, buses and other large vehicles to actuate the braking system of the vehicle. The service chamber includes a metal housing defining a chamber therein having an end wall which is mounted on a bracket on the vehicle having an opening therethrough which receives a reciprocal pushrod supported in the service chamber. The pushrod has an end portion extending through the opening in the end wall of the housing. The service chamber generally includes a cup-shaped flexible diaphragm secured at is periphery in the service chamber and one end of the pushrod includes a generally flat piston which is received against the flexible diaphragm. Upon actuation of the braking system of the vehicle, pneumatic pressure acts against the side of the flexible diaphragm opposite the pushrod piston, driving the piston through the housing end wall and actuating the vehicle brakes. The brake actuator service chamber may be mounted in tandem with a spring or an emergency chamber or the service chamber may be used alone or in combination with a separate spring chamber.

The service chamber alone or in tandem with a spring chamber is mounted on a bracket attached to the vehicle. The end wall of the service chamber generally includes a pair of holes on opposed sides of the central opening which receives the reciprocal pushrod and bolts are mounted in the holes which attach the service chamber to the vehicle bracket. The mounting bolts may, however, be welded or otherwise attached to the end wall of the service chamber.

As will be understood by those skilled in the art, brake actuator service chambers are exposed to dirt, debris, mud, ice, sleet, etc. which may interfere with the operation of the service chamber or result in wear or deterioration of the components of the service chamber. The service chamber, for example, includes a return spring which is generally biased between the end wall of the service chamber and the piston head of the pushrod. Thus, for example, dirt or ice may interfere with operation of the return spring, which returns the pushrod to its ready position, or cause deterioration of the flexible diaphragm, which is generally formed of synthetic rubber or Neoprene®. The prior art does include annular stone shields mounted in the service chamber surrounding the reciprocal pushrod and tubular flexible dust boots mounted on the pushrod. However, the prior art does not disclose an adequate and practical seal which seals the pushrod opening in the end wall of the service chamber. This is due in part to the fact that the pushrod does not always move directly in a straight line. Instead, the movement of the pushrod is sometimes skewed from the central axis of the brake rod. Thus, the prior seals have had difficulty in maintaining a seal under the extreme conditions of a brake actuator service chamber. Thus, it would be desirable to have a seal for the pushrod opening in the end wall of a brake actuator which can survive in the actual environment in which the brake actuator is used and which will provide a good seal under the operative conditions faced by the brake actuator.

Finally, it would be most desirable to more firmly mount a service chamber on the vehicle mounting bracket to reduce damage from the vibration encountered by such vehicles. Most brake actuator manufacturers subject their brake actuators to vibration testing; however, such testing is done under ideal conditions. In actual practice, the brake actuator is subject to vibration under severe conditions which may result in damage to the housing or components of the brake actuator. This is particularly true with "piggyback" brake actuators wherein the spring chamber is mounted in tandem with the service chamber because of the additional loads.

SUMMARY OF THE INVENTION

The improved sealed brake actuator service chamber of this invention includes a housing defining a service chamber therein and having an opening therethrough, a reciprocal pushrod is supported in the housing chamber having an end portion extending through the housing opening and a flexible tubular seal surrounds the pushrod within the housing chamber having a first end portion secured within the housing opening, preferably in sealed relation. The tubular seal further includes a sealing portion spaced from the first end portion which tightly circumscribes the pushrod in sealed relation. The preferred embodiments of the tubular flexible seal is generally hourglass-shaped including a reduced diameter midportion, which tightly circumscribes the reciprocal pushrod in sealed relation, and a free end portion preferably having a reinforcing rib or more preferably an internal seal which closely receives the reciprocal pushrod. The internal surface of the midportion of the seal preferably includes at least one or a plurality of radial sealing lips which engage the reciprocal pushrod. Grease may be applied to the internal surface of the tubular sealing member, preferably between the sealing lips and between the midportion and the free end portion to improve sealing and reduce friction with the reciprocal pushrod. The internal diameter of the opening through the service chamber housing preferably has a diameter substantially greater than the diameter of the pushrod to accommodate skewing of the pushrod, as described above, and the first end of the tubular seal preferably has a radial groove or channel which receives the end wall of the service chamber adjacent the opening. Thus, the tubular seal in the brake actuator of this invention fully seals the pushrod opening in the end wall of the chamber while accommodating skewed reciprocal motion of the pushrod.

The most preferred embodiments of the sealed brake actuator service chamber of this invention includes a disk-shaped relatively rigid or inflexible washer having an opening therethrough surrounding the midportion of the flexible tubular seal to improve sealing and maintain the concentricity of the seal on the pushrod. The washer is thus preferably fixed on the midportion of the tubular seal. In the disclosed embodiment, the midportion of the tubular seal includes an outwardly opening groove or channel which receives the washer. The most preferred embodiment of the washer includes a maximum radial dimension which is greater than the internal diameter of the pushrod opening in the end wall of the service chamber housing, such that the tubular seal will not be pushed through the housing opening as the pushrod reciprocates through the opening. That is, the washer is biased against an enlarged portion of the tubular seal as the pushrod reciprocates through the opening in the end wall of the housing, but is prevented from being pushed through the opening. The preferred embodiment of the washer further includes a width measured transverse to the maximum radial dimension which is less than the internal diameter of the pushrod opening which permits the tubular seal and washer assembly to be assembled through the pushrod opening on the pushrod. The ends of the washer are also preferably tapered to further facilitate assembly of the washer and seal assembly through the pushrod opening and the washer ends may be semicircular, such that the radial dimension conforms to the radial dimension of the first enlarged portion of the seal.

As set forth above, the preferred embodiments of the tubular flexible pushrod seal of this invention is generally hourglass-shaped, wherein the lower portion of the seal adjacent the service chamber housing opening has a maximum external diameter greater than the maximum radial dimension or diameter of the washer. In the most preferred embodiment of the tubular seal, the lower portion of the seal includes at least two radial lobes or cone-shaped portions providing greater length and flexibility, thereby providing improved sealing. Further, the lower portion adjacent the tubular portion which extends through the service chamber housing opening preferably extends radially outwardly to overlie the internal surface of the end wall which improves sealing and reduces the likelihood of pushing the seal through the housing opening under extreme conditions. The free end of the preferred embodiment of the flexible tubular pushrod seal includes a cone-shaped reinforced end portion which prevents the free end from being turned inwardly during flexure and a plurality of sealing lips which sealingly circumscribe the pushrod and prevent water from entering the free end of the tubular seal.

The improved sealed brake actuator service chamber of this invention thus provides an excellent seal of the pushrod opening in the end wall of the chamber while accommodating reciprocal and skewed motion of the pushrod, thereby preventing dust, debris, water and ice from entering the service chamber housing which might be detrimental to the operation of the service chamber and its components. The improved seal is relatively inexpensive and easy to assemble as an original component or existing service chambers in the field.

The improved brake actuator service chamber of this invention also includes a reinforced end wall which reduces vibration of the service chamber on the vehicle mounting bracket. As described above, service chambers of the type described herein include a generally flat end wall and a pair of mounting bolts affixed to the end wall on opposed sides of the pushrod opening. In the preferred embodiment of this invention, the end wall of the service chamber housing includes a diamond-shaped offset or recessed portion including end portions surrounding the mounting bolts and a midportion surrounding the pushrod opening. The area immediately surrounding the diamond-shaped recessed portion defines a generally flat contact surface which, in the preferred embodiment is relatively narrow. This contact surface is thus drawn flat against the vehicle mounting bracket as the nuts are torqued on the mounting bolts against the mounting bracket. This configuration not only reinforces the bottom wall of the service chamber housing, which is generally formed of steel, but also provides an improved mounting surface when the service chamber is mounted on a vehicle mounting bracket. Further, the lip of the tubular seal which is located outside the service chamber preferably includes one or a plurality of circular projecting sealing lips which resiliently engage the mounting bracket further improving the seal of the pushrod opening.

Other advantages and meritorious features of the improved brake actuator of this invention will be understood from the following description of the preferred embodiments, the appended claims and the drawings, a brief description of which follows.

BRIEF DESCRIPTION OF THE DRAWINGS

FIG. 1 is a partially cross-sectioned side view of a service chamber having one embodiment of the improved seal of this invention;

FIG. 3 is an end cross-sectional end view of the pushrod and seal assembly of FIG. 1 in the direction of the view arrows 3—3;

FIG. 4 is a perspective view illustrating the tubular seal and washer assembly shown in FIG. 3 during assembly of the seal in the pushrod opening in the service chamber housing;

FIG. 8 is an end view of the end wall of the service chamber;

FIG. 9 is a partial cross-sectional view of FIG. 8 in the direction of view arrows 9—9; and FIG. 10 is a perspective end view of the end wall of the service chamber shown in FIGS. 8 and 9.

DETAILED DESCRIPTION OF THE PREFERRED EMBODIMENT

Figure 2:
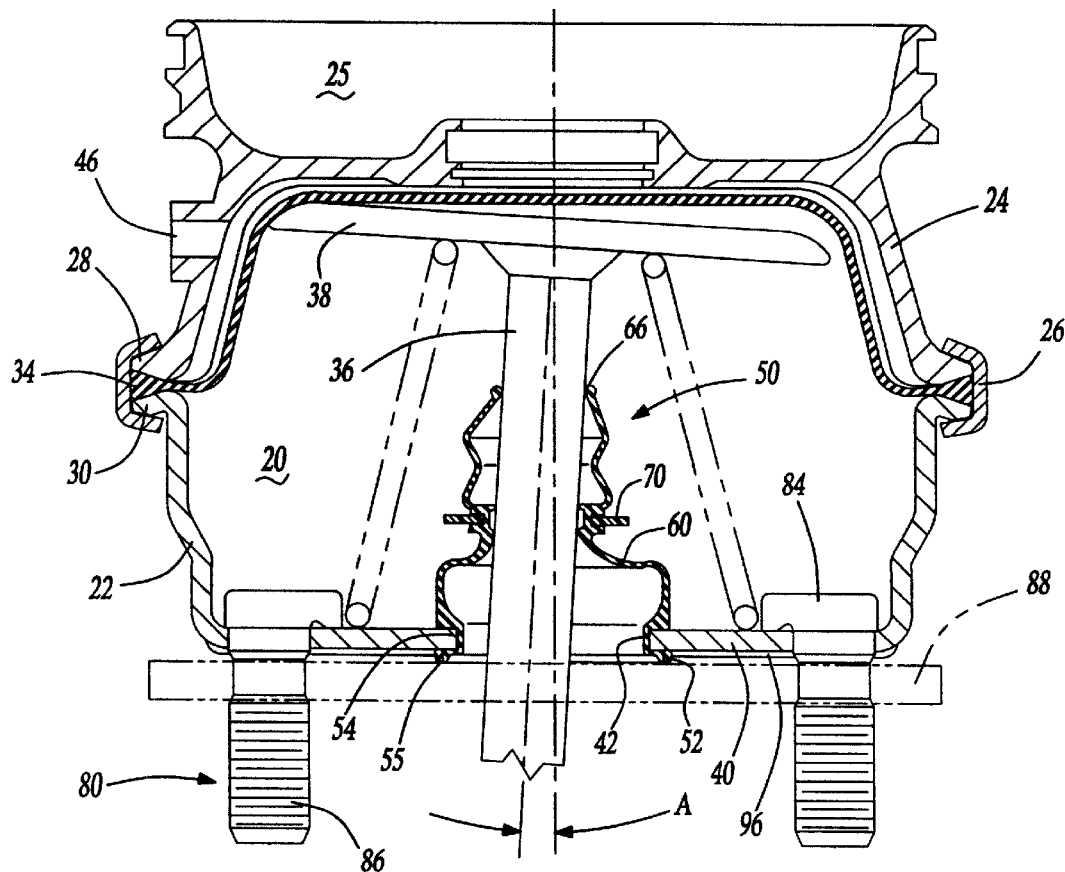
FIG. 2 is a partially cross-sectioned side view similar to FIG. 1 illustrating the potentially skewed movement of the pushrod within the service chamber.

FIG. 1 illustrates a conventional service chamber having the improvements of this invention. The service chamber 20 is defined by a service chamber housing member 22 and an upper housing 24, which is sometimes referred to as a "flange case." The housing members 22 and 24 are retained together by a conventional clamp band 26 which clamps the opposed peripheral flanges 28 and 30 of the upper housing 24 and service chamber housing 22, respectively. The service chamber 20 includes a cup-shaped flexible diaphragm 32 having a radial diamond-shaped rim 34 which is received between the radial flanges 28 and 30 and compressed during assembly by the clamp band 26. As will be understood by those skilled in the art, the service chamber housing 22 in a conventional piggyback dual chamber brake actuator as shown in FIG. 1 is formed of steel and the upper housing or flange case 24 is generally formed of cast aluminum, although both members may be steel. The flexible diaphragm 32 is generally formed of synthetic rubber, such as Neoprene® with a nylon reinforcement. The upper spring or emergency chamber 25 is enclosed by a cup-shaped cover or head (not shown) and the spring chamber 25 includes a power spring, diaphragm, etc. (not shown). As set forth above, however, the service chamber 20 may also be enclosed by a cup-shaped steel cover as a stand alone unit. The improved service chamber of this invention may be utilized as a component of a piggyback brake actuator as shown or as a stand alone unit.

A conventional service chamber further includes a reciprocal pushrod 36 having a generally flat piston or piston head 38 which is normally biased against one side of the flexible diaphragm 32 by a return spring 48 shown in phantom. The end wall 40 includes a central pushrod opening 42 which receives an end 44 of the pushrod during reciprocal movement of the pushrod. The flange case 24 includes a pneumatic port 46 which is connected to the pneumatic or air pressure system of the vehicle. When the brakes of the vehicle are actuated, pneumatic pressure through port 46 causes the flexible diaphragm to move downwardly in FIG. 1 around the radial rim 34, driving the pushrod end 44 out of the service chamber 20. The end 44 of the pushrod 36 is generally connected to a yoke assembly (not shown), which is connected to the braking system of the vehicle. When the brake is released, the pneumatic pressure through port 46 returns to zero and the return spring 48 then drives the piston 48 upwardly in FIG. 1, returning the brake actuator to the ready position as shown.

Brake actuators of the type shown are installed on the underside of the vehicle or semi-trailer adjacent the braking system and the wheels. Thus, brake actuators are subject to dirt, debris, ice, water etc. under extremely adverse conditions. The road debris is often driven into the opening 42 of the service chamber 20 interfering with the operation of the service chamber and resulting in wear or deterioration of the components. This problem has been reduced by stone shields and the like located within the service chamber 20, which may be affixed to the bottom wall 40, having an opening which closely receives the end 44 of the pushrod. However, the free end of the pushrod must follow the slack adjuster or component of the vehicle braking system, sometimes resulting in a skewed motion of the pushrod 40 as shown by angle A in FIG. 2. Thus, it would be desirable to increase the internal diameter of the pushrod opening 42 to accommodate the changing angle of the pushrod; however, an enlarged opening only exacerbates the problem of debris entering the service chamber 20 and a fixed stone shield will not accommodate extreme skewed motion of the pushrod. The seal assembly of this invention now described permits enlarging the pushrod opening 42 to accommodate skewed motion of the pushrod while assuring complete sealing of the service chamber 20, which has not been achieved by the prior art.

FIG. 1 and particular FIG. 4 illustrate one embodiment of the tubular seal 50 which includes a first end 52 having a radial channel or groove 54 which receives the periphery of the end wall 40 adjacent the opening 42 of the service chamber housing 22 as shown in FIG. 1. The disclosed embodiment of the tubular seal further includes a midportion 56 and a free end portion 58. The preferred embodiments of the seal are hourglass-shaped including a first enlarged or bowed portion 60 and a second enlarged portion 62 which, in the disclosed embodiment, is accordion-shaped. The free end 58 further includes a bead or reinforcing rib 66 which closely receives the reciprocal pushrod as shown in FIG. 1. The reduced diameter midportion 56 of the seal of this embodiment further includes one or more, preferably at least two, radial sealing lips 64 which closely circumscribe the reciprocable pushrod in sealed relation. Lubricating grease is preferably applied into the channel 65 between the sealing lips 64. Lubricating grease is also preferably applied to the internal surface or surfaces 68 of the second accordion-shaped enlarged portion 62. The first end 52 of the tubular seal 50 is thus fixed to the end wall 40 of the service chamber and the seal "follows" the motion of the reciprocal pushrod 36, even when the reciprocal motion is skewed as shown by angle A in FIG. 2.

Figure 5:
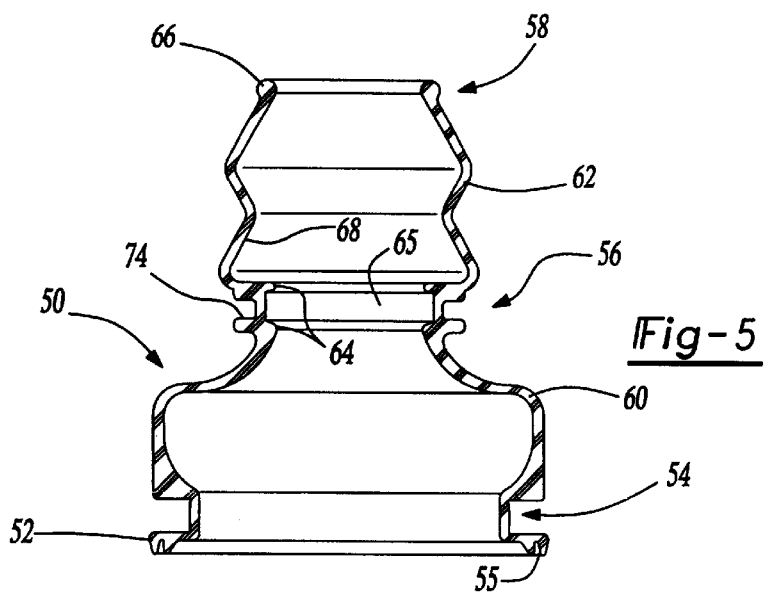
FIG. 5 is a side cross-sectional view of the tubular sealing member shown in FIGS. 1 and 2.

As will be understood, however, the seal 50 will also attempt to follow the reciprocal motion of the pushrod 36 as the brakes are actuated, driving the end 44 of the pushrod through the pushrod opening 42. This reciprocal motion may drive a portion of the seal through the pushrod opening 42, potentially damaging or eliminating the seal. Thus, the preferred embodiments of the seal of this invention includes a restraining means in the form of a disc-shaped washer 70 having an opening 72 (see FIGS. 3 and 4) which is received in a radial channel 74 in the midportion of the seal as shown in FIG. 5. The maximum radial dimension or diameter D measured between the ends 76 of the washer is however greater than the internal diameter of the pushrod opening 42 in the end wall of the chamber as shown in FIG. 3. Thus, if the midportion 56 of the seal follows the reciprocal motion of the pushrod 36 when the vehicle brakes are actuated, as shown by arrow B in FIG. 1, the washer 70 will be compressed against the bowed midportion 60 of the seal, but will not be driven through the enlarged pushrod opening 42 because the maximum radial dimension D is greater than the internal diameter of the pushrod opening 42 as shown in FIG. 3. The ends 76 of the washer 70 are also preferably rounded to generally conform to the shape of the enlarged or bowed portion 60 of the seal.

Thus, the washer 70 performs three distinct functions in the seal of this invention. First, the washer, which is preferably relatively rigid or inflexible, improves the seal of the internal of the sealing lips 64 (see FIG. 5) against the reciprocating pushrod. That is, the internal surface 72 of the relatively rigid washer prevents expansion of the midportion 56 of the seal which closely circumscribes the pushrod 36 in sealed relation. Second, the washer maintains the concentricity of the tubular seal around the pushrod. Finally, the washer prevents the tubular seal from being pushed outwardly through the enlarged pushrod opening 42 in the bottom wall 40 of the service chamber. As will be understood, the tubular seal 50 may be formed of various flexible materials, preferably materials which are relatively impervious to water and chemical attack, including natural and synthetic rubber, particularly Neoprene®. The washer 70 is preferably formed of a relatively inflexible or rigid material which will resist chemical attack, such as Nylon@. The improved seal 50 of this invention may also be injection molded in one piece from synthetic rubber.

The embodiment of the improved seal of this invention are also relatively easy to assemble in an assembled brake actuator service chamber 20. As best shown in FIGS. 3 and 4, the width W of the washer measured transverse to the maximum radial dimension or diameter D is less than the internal diameter of the pushrod opening 42 and the edges are tapered at 78 toward the end 76, such that the washer can easily be inserted through the pushrod opening 42, as shown in FIG. 4, when assembled on the seal 50. Thus, the seal is assembled in the service chamber 20 by disposing the seal around the end of the pushrod 44, inserting the free end 58 through the opening, tilting the washer 70 through the opening and finally snapping the edge of the bottom wall 40 adjacent the opening into the radial channel 54. As shown in FIGS. 1 and 5, the first end 52 of the tubular seal 50 also includes one or preferably two axially projecting spaced sealing lips 55 which engage the vehicle bracket when the service chamber is assembled on the bracket as discussed below.

Figure 6:
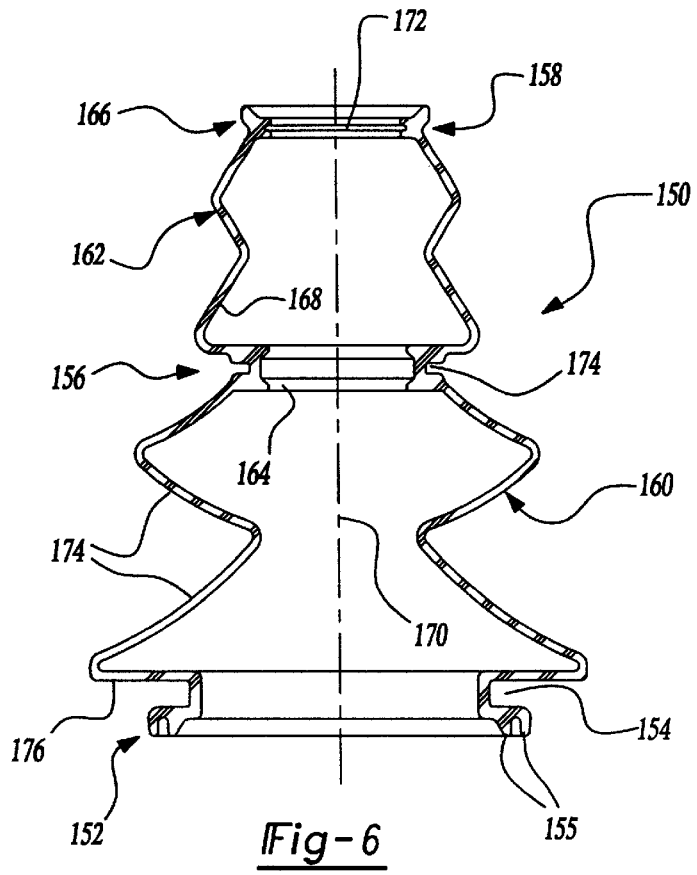
FIG. 6 is a side cross-sectional view of an alternative preferred embodiment of a tubular sealing member.

FIG. 6 illustrates an alternative improved embodiment of the tubular seal 150. For ease of reference and description, like elements of the tubular seal 150 have been numbered in the same sequence as the tubular seal 50 shown in FIGS. 1 to 5 described above. This embodiment of the flexible tubular seal 150 includes a first end portion 152 having a radial channel 154 which receives the end wall 40 of the service chamber as described above. The flexible tubular seal further includes a midportion 156 having a radial channel 174 which receives the washer 70 described above. The tubular seal further includes a first enlarged portion 160 and a second enlarged portion 162 which is accordion-shaped as described. The midportion 156 is thicker to be relatively rigid and includes an internal sealing lip or rib 164 which closely circumscribes the pushrod 36 (FIG. 1) in sealed relation. The midportion further includes a radial channel 174 which receives the washer 70 shown in FIGS. 1, 3 and 4. The free end portion 158 in this embodiment includes a truncated cone-shaped second portion 156 which opens outwardly from the central axis 170 of the tubular seal which prevents the free end portion from being turned inwardly as the pushrod 36 reciprocates downwardly in FIG. 6 through the central pushrod opening 42 shown in FIG. 1. In this embodiment, the free end 158 includes a plurality of radially extending internal lips 172 which closely circumscribe the pushrod in sealed relation. Thus, the enlarged free end portion 166 with the internal sealing lips 172 prevents moisture from entering the free end of the seal as the pushrod reciprocates in the service chamber 20. Further improvements are provided in the first enlarged portion 160 in this embodiment of the tubular seal 150. First, the first enlarged portion 160 is generally accordion-shaped having radial cone-shaped lobes 174. This shape provides additional flexibility for the seal and extends the length of the seal to enclose more of the pushrod 36. Second, the seal extends radially at 176 to overlie to internal surface of the end wall 40 to further improve sealing of the pushrod opening 42.

Figure 7:
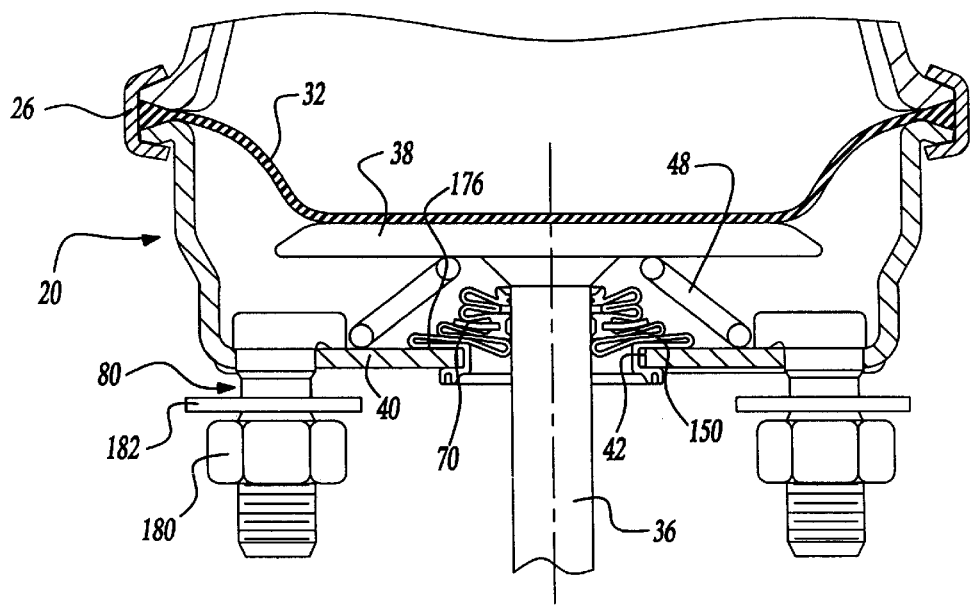
FIG. 7 is a partially cross-sectioned side view of a service chamber as shown in FIGS. 1 and 2 having the improved sealing member shown in FIG. 6, wherein the pushrod is fully extended and the seal is collapsed.

FIG. 7 illustrates the condition of the service chamber when the pushrod 36 has been fully extended during actuation of the braking system of the vehicle (not shown). The service chamber shown in FIG. 7 may be identical to the service chamber shown in FIG. 1 except that the pushrod 36 has been extended to actuate the brakes, as described above. That is, pneumatic pressure through port 46 (FIG. 1) reverses the cup-shaped diaphragm 32, which is driven against the piston 38, compressing the return spring 48. The flexible tubular seal 150 is thus compressed or collapsed as shown in FIG. 7. As described above, the washer 70 prevents the flexible tubular seal 150 from being driven through the central pushrod opening 42 in the end wall 40. Because the lower and upper enlarged portions 160 and 162, respectively, are accordion-shaped, the seal 150 collapses in a series of folds as shown in FIG. 7. Further, the seal is improved because the radial portion 176 adjacent the opening overlies the internal surface of the end wall. The seal is also maintained between the sealing lips 164 and 172 (see FIG. 6) against the pushrod 36 as the pushrod reciprocates through the central pushrod opening 42. FIG. 7 also illustrates the internally threaded nuts 180 and washers 182 which are threaded onto the mounting bolts 80 to retain the service chamber on a bracket (not shown) mounted on a vehicle. As described above, the lips 155 (see FIG. 6) seal against the bracket further assuring sealing of the opening 42 in the end wall 40.

FIGS. 8, 9 and 10 illustrate improvements in the end wall 40 of the service chamber which reinforces the end wall and reduces damage due to vibration. As set forth above, the service chambers of brake actuators are normally mounted on a bracket under the vehicle or semi-trailer near the wheels, subjecting the service chamber and brake actuator to extreme vibrational loads which may result in damage to the housing and the components of the brake actuator. A typical service chamber housing 22 includes two mounting bolts 80 which extend through openings 82 in the end wall 40 of the housing having a head portion 84 located within the service chamber and a threaded portion 86 outside of the service chamber. The mounting bolts 80 are generally equally spaced on opposed sides of the central pushrod opening 42 as shown in FIGS. 1, 2 and 7. When the service chamber is mounted on the vehicle, the threaded portion 86 of the bolts are received through openings (not shown) in the mounting bracket plate 88 and the service chamber is secured to the mounting bracket by torquing nuts 180 in FIG. 7 received on the threaded portion 86 against the mounting bracket. Various attempts have been made to reduce the vibration transmitted through the mounting bracket to the service chamber; however, these attempts have not been completely successful.

The brake actuator service chamber of this invention solves this problem by providing a recessed offset area surrounding the mounting bolts, preferably diamond-shaped, and a contact area preferably of limited width generally circumscribing the recessed offset area having a flat bottom wall which is pulled tight against the mounting bracket as the nuts on the bolting bolts are torqued against the mounting bracket. As will be understood by those skilled in the art, the bottom wall of a steel housing 22 formed by conventional techniques will not be completely flat. This is because of "oil canning" and other deformities in the bottom wall. The improved brake actuator of this invention solves this problem by providing an offset portion surrounding the mounting bolts and a predetermined contact surface generally surrounding the offset portion having a flat bottom wall which fully seats on the bracket in coplanar relation.

As shown in FIGS. 8 to 10 and now described, the end wall 40 of the service chamber 22 is reinforced and configured to reduce vibration between the service chamber housing 22 and the mounting bracket 88 shown in FIGS. 1 and 2. The end wall includes a diamond-shape offset recessed portion 90 which includes a midportion 92 surrounding the central pushrod opening 42 and end portions 94 surrounding the mounting bolt openings 82. This diamond-shaped offset recessed portion 90 is generally circumscribed by relatively thin projecting contact surfaces 96 which are sharply rounded (i.e. having a small raduis) on opposed sides of the offset recessed portion 90. The end surfaces 98 on opposed sides of the contact surfaces are further recessed by tapered walls 100 from the plane of the flat contact surfaces 96. The internal surface 102 of the recessed end surfaces 98 receive the piston 38 shown in FIGS. 1, 2 and 7.

Thus, when the end wall 40 of the service chamber housing 22 is received on the mounting bracket 88 as shown in FIGS. 1, 2 and 7, the relatively thin rounded contact surfaces 96 are the only surfaces which contact the mounting bracket 88. Then, as the nuts 180 threaded on the threaded portion 86 of the mounting bolts are torqued against the mounting bracket 88, the end portions 94 of the offset recessed portion 90 are resiliently deformed toward the plane of the bracket 88 assuring full contact of the rounded contact surfaces 96 against the bracket plate 88, thereby substantially eliminating vibration between the end wall 40 and the bracket plate 88. The width of the rounded contact surfaces 96 is preferably relatively thin. For example, in a preferred embodiment, the width of the contact surface is about ⅛" in a service chamber housing having a diameter of about 6.5". Further, the offset of the offset recessed portion 90 from the plane of the contact surfaces 96 need only be about 0.010" to 0.030" to achieve the desired effect described above.

The improvements in brake actuators and particularly service chambers of this invention therefor provide several important advantages over the prior art including a full seal of the pushrod opening in the end wall of the housing which accommodates the reciprocal and skewed motion of the pushrod and substantial elimination of vibration between the service chamber housing and the vehicle mounting bracket which has been a significant problem in the design of brake actuators. As will be understood by those skilled in the art, various modifications may be made to the embodiments of the brake actuator disclosed in this application within the purview of the appended claims. For example, the configuration of the hourglass-shaped tubular seal may be modified for particular applications, but is preferably fixed around the central pushrod opening and sealed against the pushrod at one or a plurality of locations spaced from the pushrod opening while permitting the pushrod to reciprocate through the seal and the opening. Further, other configurations of the end wall of the service chamber housing may be utilized provided the portion of the end wall surrounding the mounting bolt openings is recessed from the contact surface, although a diamond-shaped offset recessed portion and a relatively thin contact surface generally circumscribing the offset portion has been found to significantly reduce vibration during testing by the applicant. Having described the preferred embodiments of the invention, the invention is now claimed as follows.

What is claimed is:

1. A brake actuator, comprising:

a housing defining an enclosed chamber therein having an opening through an end wall of said housing;

a reciprocal pushrod supported for reciprocal motion in said housing chamber having an end portion extending through said opening in said end wall of said housing;

a pair of mounting bolts affixed to said end wall of said housing on opposed sides of said opening; and said end wall of said housing having a recessed offset portion surrounding said mounting bolts and a projecting relatively thin generally flat contact surface generally circumscribing said recessed offset portion.

2. The brake actuator defined in claim 1, wherein said recessed offset portion is generally diamond-shaped including end portions surrounding said mounting bolts and a midportion surrounding said opening through said end wall of said housing.

3. The brake actuator defined in claim 2, wherein said contact surface has a constant width surrounding said diamond-shaped recessed offset portion on opposed sides.

4. The brake actuator defined in claim 3, wherein the remainder of said end wall on opposed sides of said contact surface is recessed from said contact surface such that said contact surface is limited to said relatively thin contact surface.

5. A brake actuator, comprising:

a housing defining an enclosed chamber therein having an end wall including a central opening therethrough;

a reciprocal pushrod supported for reciprocal motion in said housing having an end portion extending through said opening in said end wail of said housing;

a pair of mounting bolts affixed to said generally flat end wall of said housing on opposed sides of said opening; and said end wall of said housing having a generally diamond-shaped recessed offset portion, said recessed offset portion including end portions surrounding said bolts and a midportion surrounding &aid opening and a flat projecting contact surface on opposed sides of said offset recess portion generally circumscribing said offset recessed portion.

6. The brake actuator defined in claim 5, wherein said projecting contact surface comprises relatively thin sharply rounded bands on opposed sides of said recessed offset portion.

7. The brake actuator defined in claim 6, wherein said end wall of said housing is generally circular and the remainder of said end wall on opposed sides of said contact surface is recessed from said generally flat contact surface.

* * * * *